Figure 1:
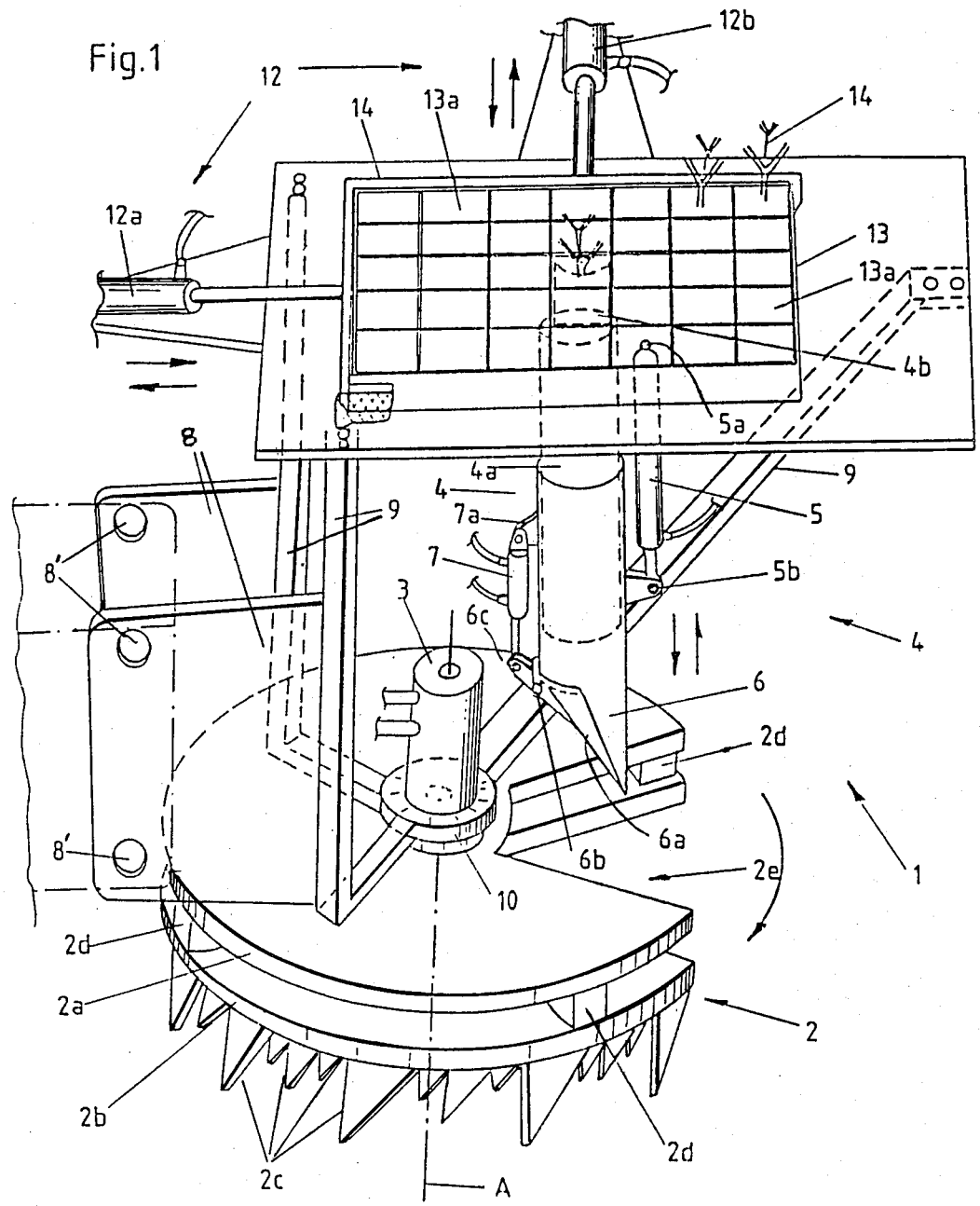

United States Patent [19]

Heum

[11] Patent Number: 4,770,111

[45] Date of Patent: Sep. 13, 1988

[54] DIBBLE TRANSPLANTER WITH HORIZONTAL TILLER

[76] Inventor: Ole Chr. Heum, N-3116, Undrumsdal, Norway

[21] Appl. No.: 32,465

[22] Filed: Mar. 31, 1987

[51] Int. Cl.$^4$ ............................................. A01C 11/02
[52] U.S. Cl. ........................................... 111/2; 111/89
[58] Field of Search ................................... 111/2, 3, 89

[56] References Cited

U.S. PATENT DOCUMENTS

| | | | |
|---|---|---|---|
| 3,712,252 | 1/1973 | Huang | 111/2 |
| 3,765,347 | 10/1973 | Formstorm | 111/89 X |
| 3,943,863 | 3/1976 | Leonard et al. | 111/2 |
| 4,273,056 | 6/1981 | Lofgren et al. | 111/2 |
| 4,278,035 | 7/1981 | Pickett et al. | 111/2 |
| 4,292,179 | 10/1981 | Cayton et al. | 111/3 |
| 4,323,019 | 4/1982 | Haddock | 111/2 |
| 4,459,924 | 7/1984 | Hassan et al. | 111/2 |

FOREIGN PATENT DOCUMENTS

| | | | |
|---|---|---|---|
| 7908827 | 1/1985 | Sweden | 111/2 |
| 211915 | 2/1968 | U.S.S.R. | 111/89 |

Primary Examiner—James R. Feyrer
Attorney, Agent, or Firm—Browdy and Neimark

[57] ABSTRACT

An arrangement in a planting device, preferably for forestating, comprising a raisable and lowerable, rotatable cutting head with a drive motor and a vertical axis of rotation for clearing a planting area on the ground. A tube shaped planting member is provided above said cutting head and has a pointed lower portion that is raisable and lowerable by the aid of a drive means and a hinged side wall with a drive means for opening the pointed portion to provide a planting hole and set down and release a plant in the cleared planting area. Cutting head has an eccentric, through recess for passing the pointed portion into the cleared planting area when cutting head is arrested with recess aligned with said pointed portion.

8 Claims, 1 Drawing Sheet

DIBBLE TRANSPLANTER WITH HORIZONTAL TILLER

The present invention relates to an arrangement in a planting device, preferably for forestation, of the kind stated in the preamble of the following independent claim 1.

Various planting devices for forestation of the above mentioned kind are known, where the forest plant is, via a planting member lowered into the central portion of the planting area that is cleared by the rotating cutter head.

An example of such a planting device is shown in U.S. patent Ser. No. 3 765 347, where the tube shaped planting member is placed centrally in relation to said cutting head and rotates with the cutting head to provide a planting hole in the soil with its lower pointed portion at the same time as the knives of the cutting head clear the area around the planting hole. This is carried out while the forest plant is inside said planting member rotating with the cutting head. When a planting hole has been provided and the area around it has been cleared the rotation of the cutting head and the planting member is stopped, and subsequently the lower, pointed portion of the planting member is opened in that a disk shaped stopping means is retracted from contact with two hinged halves of the lower pointed portion of the planting member, which are thus turned laterally to release the forest plant with simultaneous retraction of planting member and cutting head.

Another example of a planting device is shown in SE-PA No. 7908827-4, where the forest plant is, also inserted into a rotatable, tube shaped planting member having swingable digging irons forming the lower portion for providing planting holes. Outside the tube shaped planting member at least one knife is provided extending radially outwards for clearing the ground area around the planting hole. Due to the regulation of the knife a cleared area with a raised center portion in relation to the peripheral portion is provided. Thus, a certain drainage of the soil around the planting hole is achieved.

In the known planting devices the planting member and the cutting head are connected and rotate together when providing a planting hole and clearing the area around. That also means that the forest plant that is inserted in the tube shaped planting member from a box with forest plants arranged above said planting device must necessarily rotate with the cutting head and the planting member.

Especially in connection with the first mentioned planting device the central portion of the cleared planting area around the planting hole will not be treated by the cutting head, and plants or roots that may have a detrimental effect on the newly planted plant may be left untouched.

It is an object of the present invention to provide a planting device where the planting member and the cutting head are arranged independently of each other, so that the planting member with the forest plant does not rotate during clearing of the planting area and where the forest plant is planted in a portion of the cleared area that is prepared by the cutting head, so that plants and roots have been removed. By different designs of the knives of the cutting head a flat planting area or a planting area with a raised center portion respectively can be achieved. Furthermore, it is an object to be able to compact the surface of the planting area when the forest plant has been placed so as to limit evaporation from the cleared planting area.

According to the present invention this has been achieved by the aid of a planting device of the kind mentioned in the introduction and having the features appearing from the characterizing part of the following independent claim 1 as well as from the following dependent claims.

Figure 2:
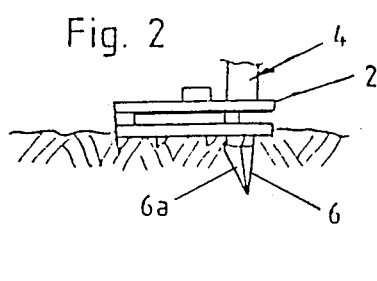
Figure 3:
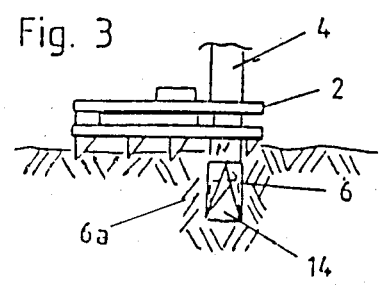

An embodiment of the planting device will be disclosed in the following with reference to the drawing, where an embodiment is schematically shown, and where FIG. 1 shows the planting device in perspective with the lower, pointed portion of the planting member raised above the cutting head, and where FIGS. 2 and 3 show the cutting head and the pointed lower portion of the planting member schematically and in a lowered position for providing a planting hole in the cleared ground, the pointed portion shown in an opened position for releasing the forest plant into the planting hole.

FIG. 2 shows the planting device 1 according to the invention, comprising a raisable and lowerable, rotatable cutting head 2 with a drive motor 3 and the vertical axis of rotation A. Above cutting head 2 a tube shaped planting member 4 is provided comprising a lower, pointed portion 6, which is raisable and lowerable by the aid of a drive means 5 and is provided with a hinged side wall 6a with a drive means 7 for opening the pointed portion 6. Said drive means 5 and 7 are in the drawing shown as pressure cylinders, e.g. being connected with the hydraulic system of a vehicle on which the planting device 1 is mounted by the aid of mounting brackets 8' with securing holes 8. The brackets are in the drawing shown to be secured to a rack 9 having a lower portion 10 with mounting means for the cutting head 2 and at the same time forming a securing means for the drive motor 3 of the cutting head. Said drive motor is in the drawing shown as a pressure motor with a hose connection to the hydraulic system of the vehicle.

Cutting head 2 has an eccentric through recess 2e which is, preferably sector shaped and extends from the periphery of cutting head 2 to its center/boss.

Cutting head 2, preferably, comprises a top disk 2a and a lower disk 2b with intermediate shock absorbers 2d, e.g. rubber members, top disk 2a being connected with drive motor 3 and lower disk 2b being provided with knives 2c on its lower face. Lower disk 2b may be releasably secured to be exchangeable with other disks 2b provided with other kinds of knives 2c for adaptability to various types of soil.

The knives 2c may, if desired, be releasably and exchangeably provided on lower disk 2b, so that any possibly damaged knives can be exchanged.

Rack 9 has a horizontal suppot plate 11 secured to its upper portion. Planting member 4 is secured to said plate with its upper, tube shaped portion 4a communicating with an opening 4b. Pressure cylinder 5 for raising and lowering the pointed lower portion 6 is secured by the aid of brackets 5a, 5b to the upper tube shaped portion 4a and is secured by the aid of brackets 5a, 5b to the lower pointed portion 6. The top part of portion 6 is tube shaped and telescopically slidable on the tube shaped upper portion 4a of planting member 4.

The wall portion 6a that may be swung out from pointed portion 6 is hinged at 6b to the tube shaped part of the pointed portion 6 and is provided with a cantilever 6c that is connected with pressure cylinder 7 which is, via a bracket 7a, secured to the upper tube shaped part of the pointed portion 6.

A displacement device 12 is provided for shifting a box 13 containing forest plants 14 in cubicles 13a in two horizontal directions at right angles so as to move each cubicle 13a with forest plants in alignment with opening 4b in the support plate for dropping a forest plant 14 from the cubicle 13a in question into the planting member 4. Displacement device 12 comprises two pressure cylinders 12a, 12b connected with the hydraulic system of the vehicle. Said pressure cylinders influence a holding member 14 gripping the box of plants 13 to hold it and shift it towards opening 4b with different cubicles 13a in turn facing said opening.

When said planting device is used it is lowered towards the ground so that the rotating cutting head 2 can clear a planting area by the aid of knives 2c removing grass, heather, or other small plants present. Then the cutting head 2 is stopped so that recess 2e is aligned with the pointed lower portion 6 of planting member 4, which portion 6 is then by the aid of pressure cylinder 5 lowered into contact with the ground and pushed down into the soil to make a planting hole. Side wall 6a of the pointed portion 6 is then opened by the aid of pressure cylinder 7, and a forest plant 14 that was dropped into the planting member falls down into the newly made planting hole. The lower pointed portion 6 is then raised again by the aid of pressure cylinder 7. During said operation cutting head 2 may, by the aid of suitable means, be urged toward the ground to compact the soil around forest plant 14 in order to reduce evaporation from the cleared planting area.

The above mentioned movements, i.e. lowering of planting device 1, rotation of cutting head 2, and stopping the same, and raising planting member 4, shifting box 13 so as to bring one cubicle 13a with forest plants 14 in an aligned position with planting opening 5a, may be manually controlled in a manner known per se from a control panel, or control may be carried out by the aid of a programmed control device.

If said planting device 1 is mounted on a digging arm of an excavator a spike may be provided projecting down from said arm for removing twigs and the like that may lie about from the planting area before this area is cleared by cutting and the forest plant is planted. In order to achieve such an operation said spike may be swingably secured to the excavator arm, so that it may be turned into a vertical depending operational position and to a turned up resting position by the aid of suitable drive means that are controlled from the same control panel as mentioned above.

The planting device is primarily intended for clearing a planting area for planting forest plants, but it may, obviously, be used for planting vegetable plants or other plants from a planting box in oridnary arable land that is ploughed and harrowed in advance. Furthermore, the device may also be used for sowing, utilizing a seed holder that will drop one or a number of seeds into the planting member 4 for each sowing operation.

When the planting device is used for planting forest plants, planting may be carried out immediately after felling or thinning, because of the possibility to remove twigs etc. by the aid of said spike. With previously known planting devices planting operations had to be postponed for two-three years so that twigs etc. could partly decompose. Planting forest plants with the planting device according to the invention, a distance between plants of 2-3 meters is used. Such spot cultivation of the soil in the cleared area will prevent beetles and other vermin from destroying roots and plants, and it will, also, be more easy to distinguish the forest plant from surrounding plants because of the harrowing or clearing of the planting area that is carried out.

The cutting head 2 of said planting device may be used, independently of the planting member 4, for harrowing the soil in limited areas corresponding to the size of the cutting head, or by moving said head to and fro for harrowing larger areas so as to remove grass, heather, and roots, etc. from said areas.

Having described my invention, I claim:

1. A planting device comprising means for raising and lowering said device, rotatable cutting head with a drive motor and a vertical axis of rotation for clearing a planting area on the ground, and a tube shaped planting member provided above said cutting head and comprising a pointed lower portion that is raisable and lowerable by a first drive member and has a hinged side wall with a second drive member for opening said pointed portion for providing planting holes and for setting and releasing plants in the cleared planting area, said cutting head being provided with an eccentric, recess therethrough for passing said pointed portion into the cleared planting area, means mounting said planting member for reciprocation by the first drive means above said cutting head, and means controlling said drive motor allowing said recess to be aligned beneath said planting member, whereby said first drive member can be caused to pass said planting member through said recess and into the underlying soil.

2. A device as claimed in claim 1, wherein said cutting head comprises an upper and a lower disk with intermediate shock absorbers, said upper disk being connected to drive motor and said lower disk being provided with knives on its lower side.

3. A device as claimed in claim 2, further comprising means releasably securing said lower disk for replacement of disks having different kinds of knives for the adaption to various kinds of soil.

4. A device as claimed in claim 3, further comprising means releasably and replaceably connecting said knives on the lower disk.

5. A device as claimed in claim 1, wherein said recess extends from the periphery of the cutting head to a center/boss thereof.

6. A device as claimed in claim 5, wherein said recess is open at the periphery of said cutting head.

7. A device as claimed in claim 6, wherein said recess is generally sector shaped.

8. A device as claimed in claim 1, wherein said planting device is provided with mounting brackets with securing holes which mounting brackets are secured to a rack on which the cutting head and said drive motor for said cutting head are mounted, said mounting brackets having means for mounting on an excavating arm of a prime mover.

* * * * *